United States Patent
Fujioka (10) Patent No.: US 9,721,082 B2
(45) Date of Patent: Aug. 1, 2017

(54) COMPUTING DEVICES HAVING ACCESS CONTROL

(71) Applicant: Mattel, Inc., El Segundo, CA (US)

(72) Inventor: Robb Fujioka, Manhattan Beach, CA (US)

(73) Assignee: Mattel, Inc., El Segundo, CA (US)

( * ) Notice: Subject to any disclaimer, the term of this patent is extended or adjusted under 35 U.S.C. 154(b) by 950 days.

(21) Appl. No.: 13/910,083

(22) Filed: Jun. 4, 2013

(65) Prior Publication Data

US 2014/0358780 A1 Dec. 4, 2014

(51) Int. Cl.
| | |
|---|---|
| G06F 21/00 | (2013.01) |
| G06F 21/34 | (2013.01) |
| G06F 21/35 | (2013.01) |
| G06Q 20/38 | (2012.01) |
| H04L 29/06 | (2006.01) |
| G06Q 20/40 | (2012.01) |

(52) U.S. Cl.
CPC ............ *G06F 21/34* (2013.01); *G06F 21/35* (2013.01); *G06Q 20/3821* (2013.01); *G06Q 20/40* (2013.01); *H04L 63/0853* (2013.01)

(58) Field of Classification Search
None
See application file for complete search history.

(56) References Cited

U.S. PATENT DOCUMENTS

| | | | | |
|---|---|---|---|---|
| 6,973,576 | B2 * | 12/2005 | Giobbi | G06F 21/10 |
| | | | | 380/202 |
| 7,761,385 | B2 * | 7/2010 | Hutchison | G06Q 20/02 |
| | | | | 235/379 |
| 8,943,187 | B1 * | 1/2015 | Saylor | H04L 67/306 |
| | | | | 709/223 |
| 9,020,854 | B2 * | 4/2015 | Giobbi | G06F 21/10 |
| | | | | 705/51 |
| 9,432,361 | B2 * | 8/2016 | Mahaffey | H04L 63/0853 |
| 2005/0261984 | A1 * | 11/2005 | Hutchison | G06Q 20/02 |
| | | | | 705/79 |
| 2012/0182939 | A1 * | 7/2012 | Rajan | A61B 5/0008 |
| | | | | 370/328 |
| 2013/0111211 | A1 * | 5/2013 | Winslow | H04L 9/3234 |
| | | | | 713/171 |
| 2013/0237190 | A1 * | 9/2013 | Smith | H04L 63/0492 |
| | | | | 455/411 |

(Continued)

*Primary Examiner* — Mamon Obeid
*Assistant Examiner* — El Mehdi Oussir
(74) *Attorney, Agent, or Firm* — Kolisch Hartwell, P.C.

(57) ABSTRACT

Computing devices having access control are disclosed. The computing device may include a display, one or more processors, a non-transitory storage media, a communication interface, and an operating system. The storage media may include instructions stored therein that are configured to be executed by the one or more processors. The stored instructions may include instructions for reading an identifier (ID) of a physical key via the communication interface. The stored instructions may additionally include instructions for determining whether the ID read from the physical key is included on a list of paired physical keys. The stored instructions may further include instructions to communicate to the operating system an authorization signal equivalent to input of a valid password when the ID read from the physical key is included on the list of paired physical keys.

6 Claims, 8 Drawing Sheets

(56) References Cited

U.S. PATENT DOCUMENTS

2015/0222517 A1\* 8/2015 McLaughlin ......... H04L 67/303
   713/156
2016/0337863 A1\* 11/2016 Robinson .............. H04W 12/08

\* cited by examiner

COMPUTING DEVICES HAVING ACCESS CONTROL

TECHNICAL FIELD

The inventions relate generally to the field of access controls for computing devices and, more particularly, but not by way of limitation, to new and non-obvious access control systems that use near-field communication (NFC) tags in conjunction with an NFC reader interface or other communication interface and access control software on a computing device to manage access to the computing device, resources thereof, and/or virtual credits usable in e-commerce transactions.

BACKGROUND

Controlling access to computing devices and/or resources thereof is needed for reasons including, without limitation, privacy, child safety, and corporate security. Previously known access controls for computing devices conventionally are implemented through the use of login credentials (e.g., user name and/or password challenges) and/or biometric authentication (e.g., fingerprint readers), among other things.

Computing devices increasingly are used in settings such as family and enterprise environments in which multiple users may need or want to use the same computing device. In such use cases, reliable control over access to the device and/or resources thereof is critical. While password-based controls have been used in such circumstances, they are not always suitable or sufficient because, for example without limitation, passwords can be guessed, stolen, forgotten, or otherwise compromised. Biometric authentication measures, such as fingerprint readers, lack some of the shortcomings of password-based controls, but biometric authentication can be problematic because it relies on the physical presence of an individual person. Thus, biometric authentication is not possible in situations where authentication is needed in the absence of the physical presence of the individual granting authorization.

There is a need for an access control system which can be used whenever authentication is required, e.g., whenever a password would be required, but does not suffer from the disadvantages of password-based and biometric authentication measures.

BRIEF SUMMARY

In exemplary embodiments, an access control system is provided for a computing device that has a display, one or more processors, a storage media, an near-field communication (NFC) reader interface, and an operating system. The access control system is stored in the storage media and configured to be executed by the one or more processors. Exemplary access control systems include instructions for detecting the presence of an NFC tag within an operative range of the NFC reader interface, establishing an NFC communication link between the NFC reader interface and the NFC tag, and reading an identifier (ID) from the NFC tag by the NFC reader interface, as well as instructions for determining whether the ID read from the NFC tag is included on a list of paired NFC tags. In such exemplary embodiments, if the ID read from the NFC tag is included on the list of paired NFC tags, then the access control system invokes instructions to communicate an authorization confirmation to the operating system equivalent to input of a valid password.

In some embodiments, if the ID read from the NFC tag is not on the list of paired NFC tags, then the access control system invokes instructions for determining whether the ID read from the NFC tag is included on a list of approved NFC tag identifiers. If the ID read from the NFC tag is included on the list of approved NFC tag identifiers, then the access control system invokes instructions to cause the display screen to display a password prompt and to respond to input of a valid password by encrypting and storing the ID read from the NFC tag on the list of paired NFC tags. Otherwise, if the ID read from the NFC tag is not included on the list of approved NFC tag identifiers, then the access control system does not pair with the NFC tag.

In some embodiments, the computing device further comprises a wireless data communication interface, the list of approved NFC tag identifiers is stored on a computer other than the computing device, and the access control system includes instructions for communicating via the wireless data communication interface with the computer other than the computing device in connection with determining whether the ID read from the NFC tag is on the list of approved NFC tag identifiers.

In some exemplary embodiments, a tablet computer or other computing device includes an access control system together with an operating system (OS) and an OS Overlay system. In other embodiments, the access control system is provided without an OS Overlay system, as software executable within an operating system of a tablet computer or other computing device.

The inventor hereof has also filed co-pending application Ser. No. 13/841,461, entitled "Tablet Computer", filed Mar. 15, 2013, and Ser. No. 13/852,840, entitled "Tablet Computer", filed Mar. 28, 2013, which describe illustrative tablet computers suitable for use with the access control systems described herein, and which are hereby incorporated herein in their respective entireties by this reference. However, the access control systems described herein are not limited to such tablet computers but, rather, may be provided on any computing device.

Various embodiments may incorporate one or more of these and other features described herein while remaining within the spirit and scope of the invention. Further features of the access control system, its nature, and various advantages and embodiments will be more apparent by reference to the accompanying drawings and the following detailed description.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which.

DETAILED DESCRIPTION

In the following description, numerous specific details have been set forth to provide a more thorough understanding of some embodiments of the present invention. However, it will be appreciated by those skilled in the art that embodiments of the invention may be practiced without such specific details or with different implementations for such details. Additionally some well known structures have not been shown in detail to avoid unnecessarily obscuring the present invention.

NFC is a set of short-range wireless technologies, typically requiring a distance of 10 cm or less. NFC uses magnetic induction between two loop antennas located within each other's near field, effectively forming an air-core transformer. NFC always involves an initiator and a target. The initiator actively generates an RF field that can power a passive target. This enables NFC targets to reside in simple physical form factors, such as physical keys, tags, stickers, key fobs, or cards. NFC tags contain data and are typically read-only, but may be rewriteable. They can be custom-encoded by their manufacturers or use the specifications provided by the NFC Forum. See generally www.nfc-forum.org.

NFC tags can securely store data. Most tags have a stable unique identifier (ID), but some tags will generate a pseudo random ID every time they are discovered, and there are some tags with no ID at all (the byte array will be zero-sized). The tag ID is a low level serial number, used for anti-collision and identification. The size and format of an ID is specific to the RF technology used by the tag.

NDEF is an NFC Forum data format. There are currently four NFC Forum standardized tag types that can be formatted to contain NDEF data:
NFC Forum Type 1 Tag (NFC_FORUM_TYPE_1), such as the Innovision Topaz;
NFC Forum Type 2 Tag (NFC_FORUM_TYPE_2), such as the NXP MIFARE Ultralight;
NFC Forum Type 3 Tag (NFC_FORUM_TYPE_3), such as Sony Felica; and
NFC Forum Type 4 Tag (NFC_FORUM_TYPE_4), such as NXP MIFARE Desfire.

Reading NDEF data from an NFC tag may be handled, for example and without limitation, with the tag dispatch system in Android, which analyzes discovered NFC tags, appropriately categorizes the data, and starts an application that is interested in the categorized data. An application that wants to handle the scanned NFC tag can declare an intent filter and request to handle the data.

NDEF data is encapsulated inside a message (NdefMessage) that contains one or more records (NdefRecord). Each NDEF record must be well-formed according to the specification of the desired type of record. It is also possible to use other types of tags that do not contain NDEF data and/or to use other protocols for communication with NFC tags.

There are two modes of NFC communication: passive and active. In passive communication mode, the initiator device provides a carrier field and the target device answers by modulating the existing field. In this mode, the target device may draw its operating power from the initiator-provided electromagnetic field, thus making the target device a transponder. In active communication mode, both initiator and target device communicate by alternately generating their own fields. A device deactivates its RF field while it is waiting for data. In this mode, both devices typically have power supplies.

In general, the access control system leverages an NFC tag as a secure physical substitute for a password. A physical key that includes an NFC tag can be read by an NFC reader interface and software on a computing device through contact or contact-less communication in order to complete an action that requires authentication and/or authorization. Such actions requiring authentication and/or authorization in connection with which the physical key may be used include, without limitation, unlocking the device, switching between user interfaces and/or user environments of the computing device, accessing data and/or application programs, purchasing, configuration of hardware and/or software settings of the computing device, configuration of parental controls or other limitations on accessibility of content on the computing device.

Advantageously, because of the small physical dimensions of NFC tags, the physical key containing the NFC tag may be any physical object of dimensions sufficient to accommodate the NFC tag. This feature facilitates increased merchandising opportunities associated with the computing device, as many different kinds of objects can be sold as physical keys for the access control system, such as, without limitation, branded accessories and toys, as well as licensed merchandise that can be used to unlock specific content relating to an entertainment property.

The access control systems use the unique ID encoded on the NFC tag in the physical key and an NFC reader interface and software on the computing device to read the NFC tag ID, determine whether the NFC tag ID is included on a list of approved IDs, and pairing the physical key with the computing device subject to an authorized user's acknowledgment and permission. The access control system software then will encrypt and store the NFC key ID on the computing device. Pairing only needs to happen once for every individual key. In the case of the key stored on the computing device being lost, a user only needs to pair the key again or acquire a new key. After the initialization process is done, the software will automatically complete an authentication and/or authorization process when user taps the key on the tablet or brings the key in close proximity with the tablet in response to a password prompt.

While some embodiments may be used with generic NFC tags available in the marketplace, some embodiments provide additional security through the use of proprietary NFC tags with custom IDs that can only be acquired from authorized sources. When a physical key containing an NFC tag is brought into close proximity and/or contact with the computing device, an NFC reader interface in the computing device establishes an NFC communication link with the NFC tag and retrieves the unique ID from the NFC key. An ID lookup module then will query a database to determine whether the ID is included on a list of approved IDs. The list of approved IDs may be stored locally on the computing device, or it may best stored remotely and accessed using network communication capabilities of the computing device. Pairing and other actions of the access control system discussed herein are allowed to proceed only if the ID in the NFC key is included in the list of approved IDs.

The access control systems may be used in exemplary embodiments to authorize actions such as, but not limited to, the following:
1. Mode switching (e.g., switching between user interfaces and/or user environments on the computing device);
2. Payment authorization (e.g., authorizing purchases of content and/or applications); and
3. Content filtering (e.g., authorizing access to content to which access would otherwise be blocked).

Embodiments that facilitate these actions are further described below.

Figure 1:
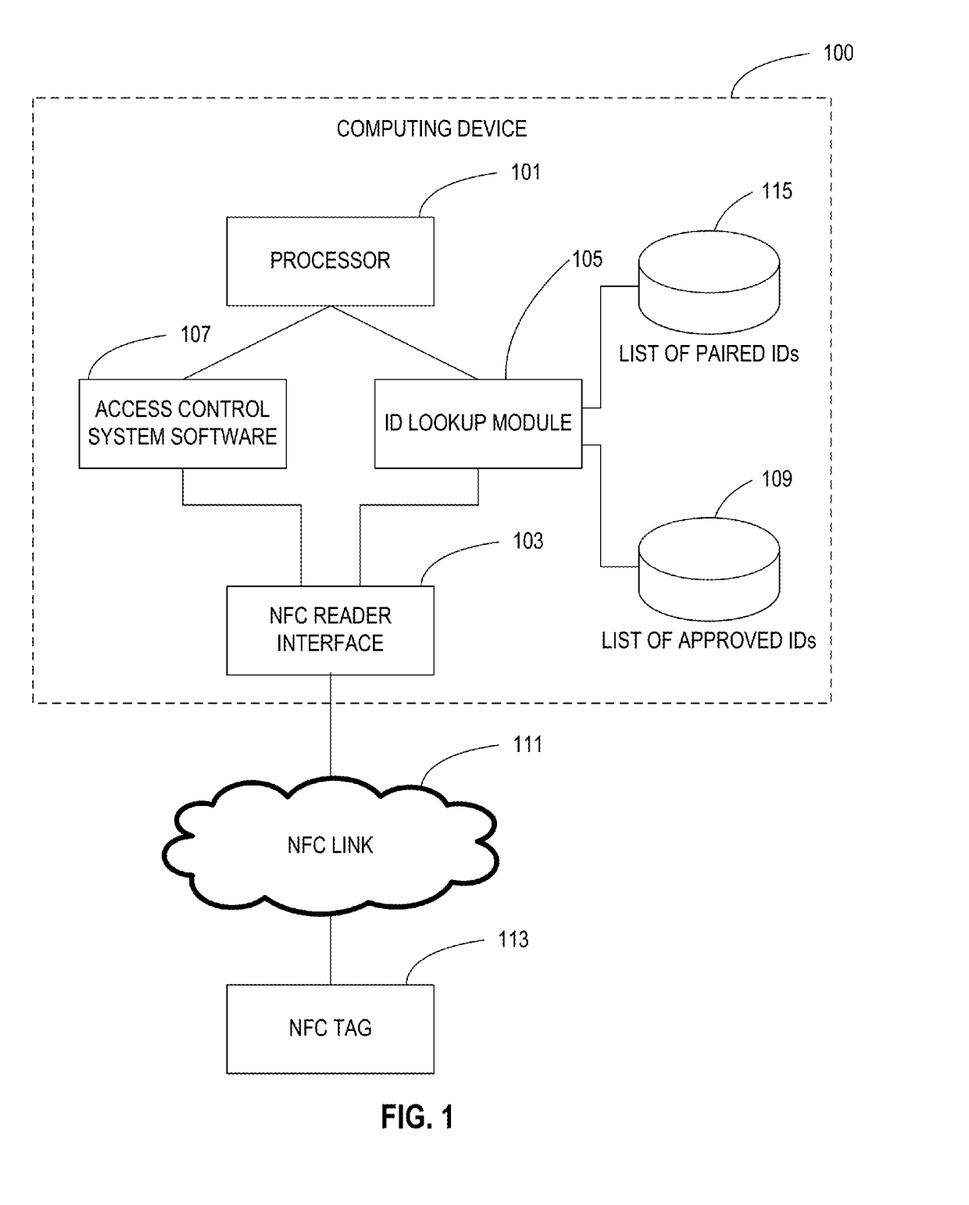
FIG. 1 is a block diagram illustrating an exemplary configuration for an access control system, according to some embodiments.
Figure 3:
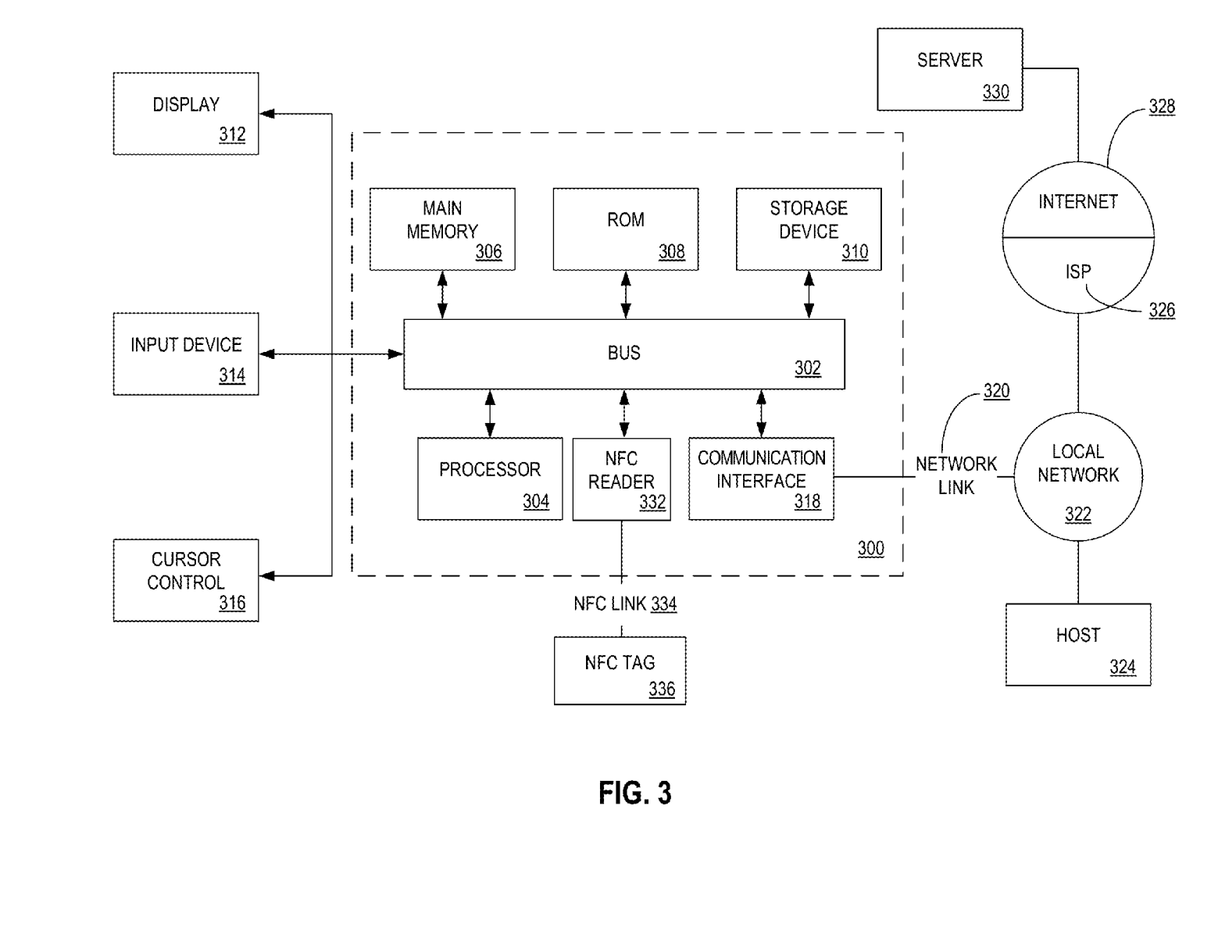
FIG. 3 is a block diagram that illustrates a computer system upon which some embodiments may be implemented.

In the exemplary embodiment shown in FIG. 1, computing device 100 includes processor 101 operable to execute instructions for the access control system software 107 and instructions for the ID lookup module 105. A list of approved IDs 109 and a list of paired IDs 115 may be stored on the computing device 100, as illustrated in FIG. 1. The list of approved IDs 109 and/or the list of paired IDs 115 may optionally be encrypted. Alternatively, in other embodiments (not shown), the list of approved IDs 109 may be stored remotely and accessed via network communication capabilities of the computing device 100, as illustrated in FIG. 3. Computing device 100 further includes an NFC reader interface 103 capable of communicating with NFC tags in accordance with NFC standards and technical specifications. When an NFC tag 113 is brought into close proximity and/or contact with the computing device 100, the NFC reader interface 103 establishes an NFC link 111 enabling wireless communication between the NFC reader interface 103 and the NFC tag 113 and the reading by the NFC reader interface 103 of an ID encoded on the NFC tag 113.

Additional details of the computing device are shown in FIG. 3, which is a block diagram that illustrates a computer system 300 upon which some embodiments may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or a flash memory device, is provided and coupled to bus 302 for storing information and instructions.

Computer system 300 may be coupled via bus 302 to a display 312, such as a cathode ray tube (CRT) or liquid crystal display (LCD) or other display device, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. In some embodiments, input device 314 is integrated into display 312, such as a touchscreen display for communication command selection to processor 304. Another type of input device includes a video camera, a depth camera, or a 3D camera. Another type of input device includes a voice command input device, such as a microphone operatively coupled to speech interpretation module for communication command selection to processor 304.

Some embodiments are related to the use of computer system 300 for implementing the techniques described herein. According to some embodiments, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments are not limited to any specific combination of hardware circuitry and software. In further embodiments, multiple computer systems 300 are operatively coupled to implement the embodiments in a distributed system.

The terms "machine-readable medium" as used herein refer to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical disks, magnetic disks, or flash memory devices, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, flash memory device, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a data transmission line using a modem. A modem local to computer system 300 can receive the data on the data transmission line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or other internet connection device, or a modem to provide a data communication connection to a corresponding type of data transmission line. As another example, communication interface 318 may be a local area network (LAN) card to provide a data communication connection to a compatible LAN. Wireless network links may also be implemented. In any such implementation, communication interface 318 sends and receives electrical, electromagnetic or optical signals that carry digital data streams representing various types of information.

Computer system 300 also includes an NFC reader interface 332 coupled to bus 302. NFC reader interface 332 provides a communication coupling to an NFC communication link 334 between NFC reader interface 332 and NFC tag 336. NFC communications preferably, but not necessarily, conform with NFC Forum specifications and/or existing standards including, without limitation, ISO/IEC 18092 and ISO/IEC 14443-2,3,4, as well as JIS X6319-4. While the exemplary embodiments described herein contemplate communications compliant with NFC standards, communications may vary from NFC standards with respect to communications protocols and/or data exchange formats to enhance security and/or copy protection, may use other radio-frequency identification (RFID) standards, and/or may use other modes of communications, such as but not limited to Bluetooth, wi-fi, and wired communications such as USB. NFC reader interface 332 and NFC tag 336 both include loop antennas, which, when located within each other's near field, use magnetic induction to form an air-core transformer within the globally available and unlicensed radio frequency ISM band of 13.56 MHz to communicate data wirelessly.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the Internet 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Figure 2:
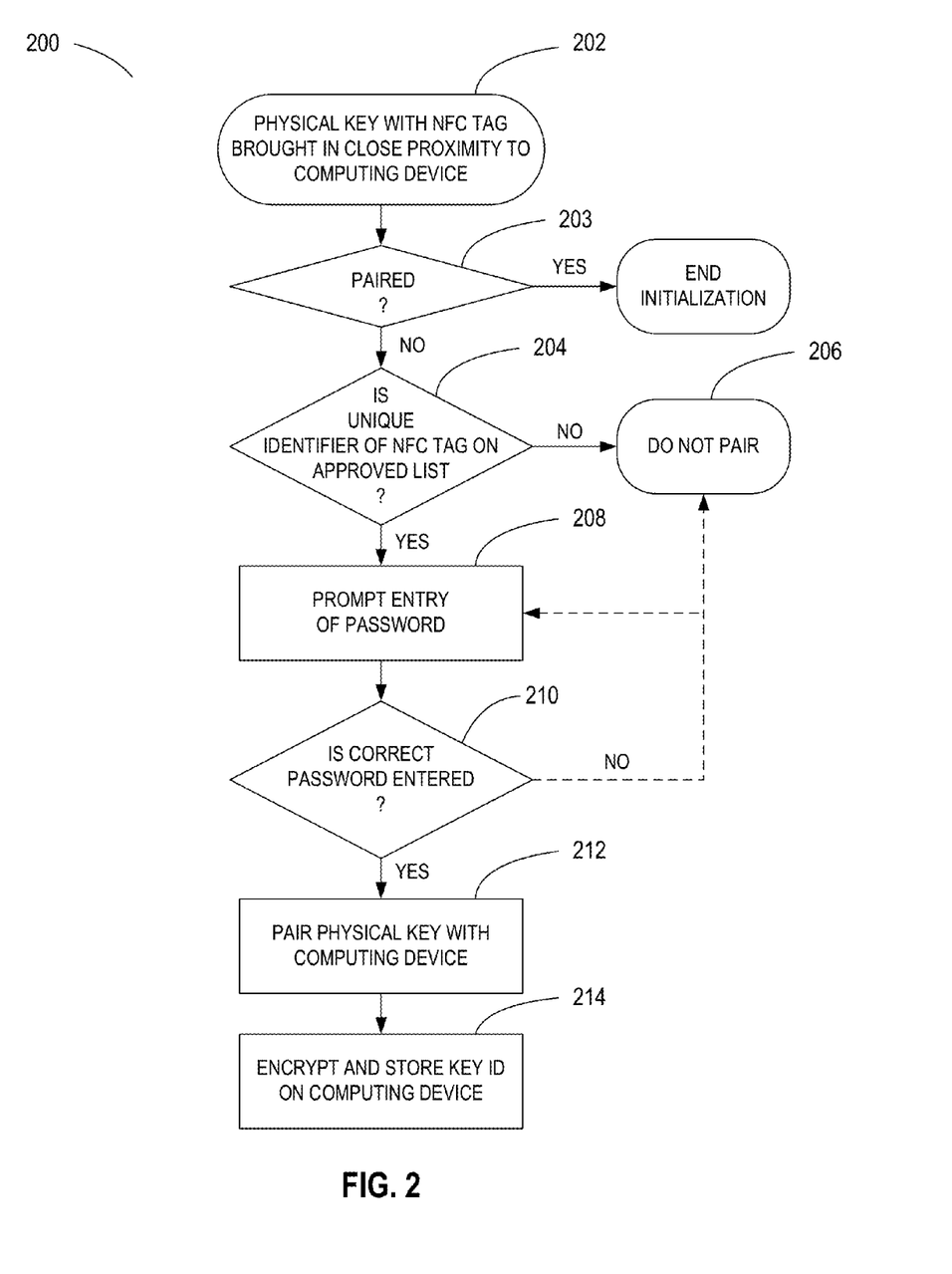
FIG. 2 is a diagram illustrating an initialization process for an access control system, according to some embodiments.
Figure 7:
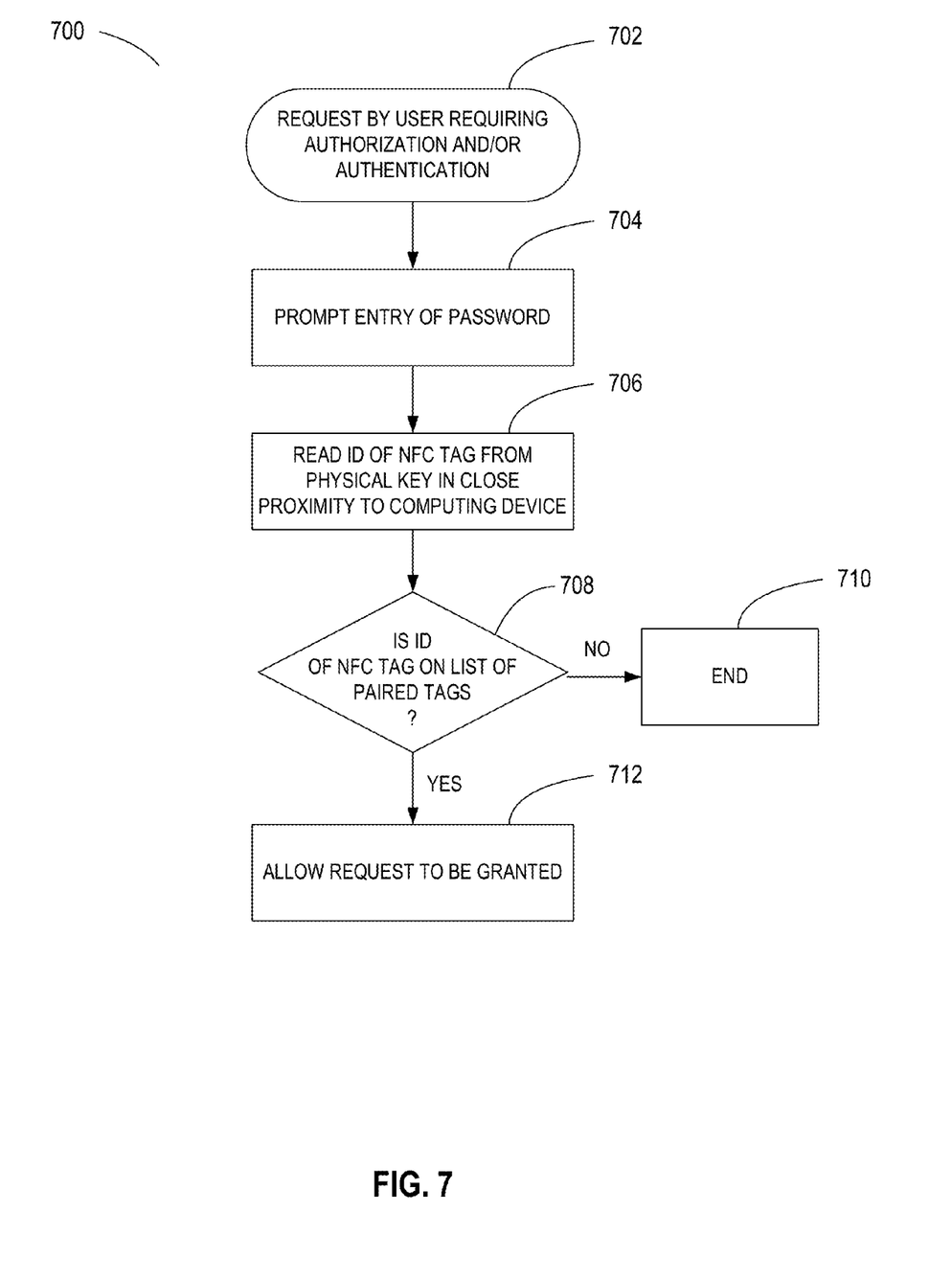
FIG. 7 is a diagram illustrating an exemplary usage flow, according to some embodiments.

An NFC tag must be paired with the computing device in the first instance through an initialization process, an exemplary embodiment of which is illustrated in FIG. 2. As shown in FIG. 2, a physical key is brought into close proximity and/or contact with the computing device at step 202. In some embodiments, communications between the physical key and the computing device are conducted using communications other than NFC, including without limitation known wireless communication such as Bluetooth or Wi-Fi or wired communication such as USB. The NFC reader interface, or other communications interface, of the computing device reads the ID in the physical key and communicates the ID to the access control system. At step 203, the access control system determines whether the ID is on a list of paired IDs. If the access control system determines at step 203 that the ID is on a list of paired IDs, then the initialization process ends and, for example, an authorization process may proceed as illustrated in FIG. 7. If the access control system determines at step 203 that the ID is not on a list of paired IDs, then the initialization process continues to step 204. In some embodiments, illustrated with reference to FIG. 8, the ID corresponds to a virtual credit rather than a password. In such embodiments, the ID in a physical key may correspond to a virtual credit that may be exchanged for value, in which case a process is implemented for determining whether the ID is on a list of valid credit IDs as further illustrated in FIG. 8 and the accompanying description, The access control system determines whether the ID is on a list of approved IDs at step 204. The list of approved IDs may be stored on the computing device or it may be stored remotely and accessed via a communication capability of the computing device. In the alternative, in the event that the computing device does not have access to a remotely stored list of approved IDs, for example, without limitation, because the computing device is operating in an offline mode, the access control system may verify whether an ID is an approved ID by determining whether the ID meets predetermined rules for approved IDs. This may include by way of example, but is limited to, determining whether IDs include a predetermined alphanumeric prefix or other predetermined, identifiable series or pattern common to approved IDs and/or follow a proprietary format for approved IDs based on which they can be distinguished from unapproved IDs. If it is determined at step 204 that the ID of the NFC tag is not on the list of approved IDs, then the computing device will not pair with the physical key containing the NFC tag, as indicated at step 206. If, instead, it is determined at step 204 that the ID of the NFC tag is on the list of approved IDs, then the process proceeds to step 208, in which the input of a password of an authorized user of the computing device is prompted. Upon input of a password, the process proceeds to step 210, where a determination of whether the password is correct is made. If it is determined at step 210 that the input password is not correct, then the computing device will not pair with the physical key containing the NFC tag, as indicated at step 206, or, in other embodiments, the process returns to step 208 to re-prompt the input of a password, optionally subject to a limited number of attempts after which the computing device may automatically lock itself for security. If it is determined at step 208 that the input password is correct, then the process proceeds to step 212, in which the NFC tag-containing physical key is paired with the computing device. The process then proceeds to step 214, in which the ID of the paired key is encrypted and stored on the computing device for future use as a physical substitute for a password or other form of authentication.

Figure 8:
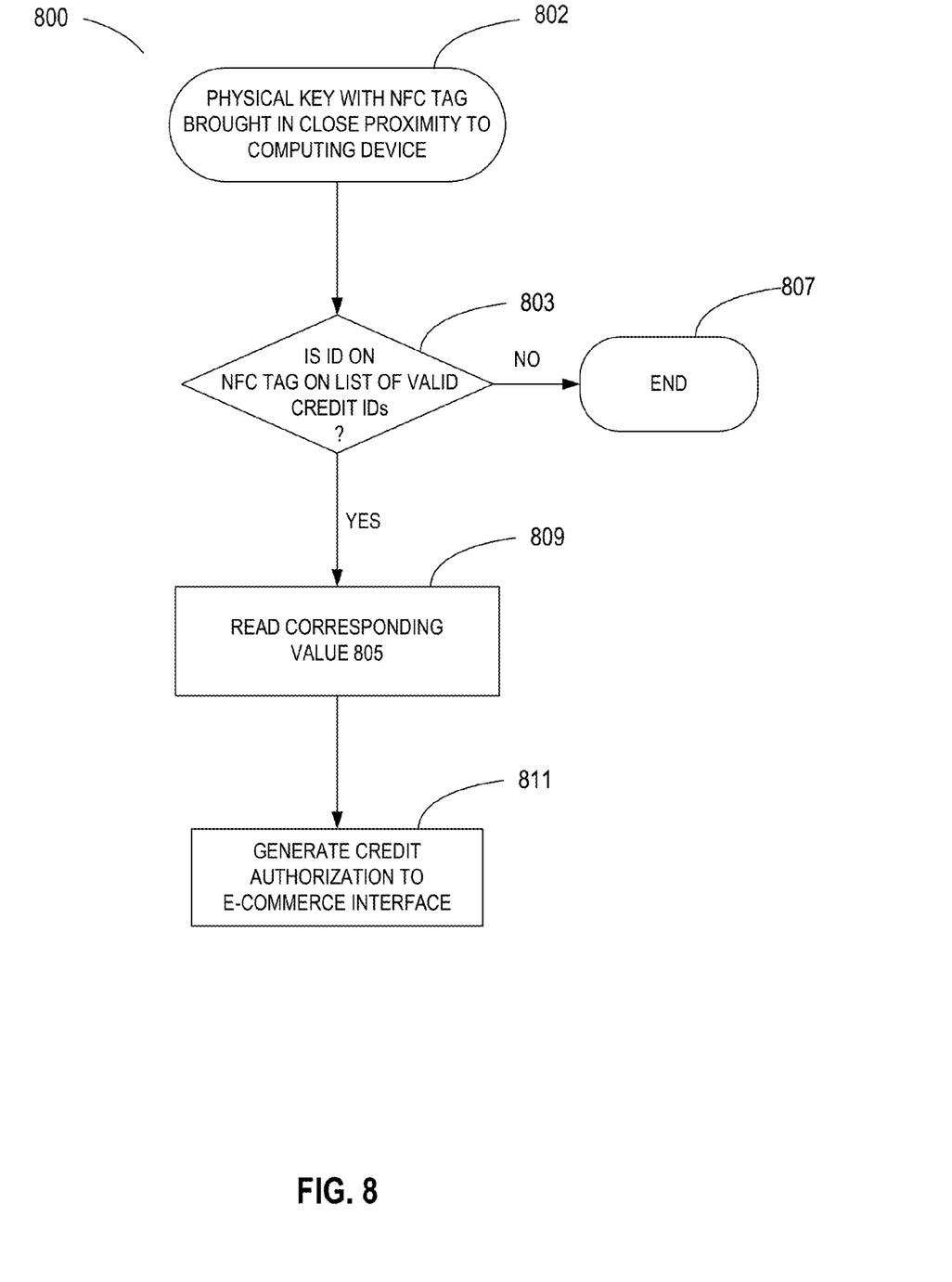
FIG. 8 is a diagram illustrating another exemplary usage flow, according to some embodiments.

In other exemplary embodiments, the access control system may be used in connection with redemption of virtual credits on the computing device, which can be used to purchase virtual or physical items via an e-commerce interface on the computing device. FIG. 8 illustrates an exemplary embodiment of a usage flow 800 for redeeming virtual credits. As shown in the exemplary embodiment illustrated in FIG. 8, a physical key containing an NFC tag is brought into close proximity and/or contact with the computing device at step 802. In some embodiments, communications between the physical key and the computing device are conducted using forms of communication other than NFC, including without limitation known wireless communications such as Bluetooth or Wi-Fi or wired communications such as USB. The NFC reader interface, or other communications interface, of the computing device reads the ID in the physical key and communicates the ID to the access control system. At step 803, the access control system determines whether the ID is on a list of valid credit IDs, which includes a corresponding value 805 for each valid credit ID. The list of valid credit IDs is stored at a secure remote location and accessible to the computing device using a communication capability of the computing device. Alternatively, in offline use embodiments, rather than determining at step 803 whether the ID is on a list of valid credit IDs, the access control system determines whether the ID conforms with a predetermined, identifiable series or pattern common to valid credit IDs and/or a proprietary format for valid credit IDs based on which they can be distinguished from other IDs not valid for credit. If the access control system determines at step 803 that the ID is not on a list of valid credit IDs or that the ID is not a valid credit ID using the other techniques described herein, then the usage flow 800 ends at step 807. If the access control system determines at step 803 that the ID is on a list of valid credit IDs or that the ID conforms with a predetermined, identifiable series or pattern common to approved IDs and/or follow a proprietary format for approved IDs based on which they can be distinguished from other IDs not valid for credit, then the access control system reads the corresponding value 805 at step 809 and at step 811 generates an authorization to an e-commerce interface on the computing device to increment a credit balance on the computing device by the corresponding value 805 of the ID determined to be a valid credit ID.

According to some embodiments, the computing device's operating system (OS) is provided with at least two different user interfaces (UIs), whereby each UI may be customized based on a specific user type or profile, and the NFC tag-containing physical key is used to authorize switching between the UIs and/or to authorize access within a managed UI to resources of the computing device. Such embodiments may use the teachings disclosed in co-pending application Ser. No. 13/841,461, entitled "Tablet Computer", filed Mar. 15, 2013, and Ser. No. 13/852,840, entitled "Tablet Computer", filed Mar. 28, 2013.

For example, in the context of a family group, user interface types or profiles may include one or more interfaces or profiles for children ("Kid Mode") and one or more interfaces or profiles for parents ("Parent Mode"). Exemplary embodiments described herein refer to Parent/Parent Mode and Kid/Kid Mode to represent examples of different user types and user interfaces. However, such descriptions are solely for illustrative purposes and shall not limit the scope of the invention, and such embodiments may be useful in any multi-user environment that may benefit from user profile-based customization of UI and access to applications and content. Other users and user types may be used with embodiments of the invention without departing from the spirit of the invention. In some embodiments, each type of UI is different in visual appearance and in work flow. Embodiments may be implemented with any OS, including mobile OSs, such as Android, iOS, bada, BlackBerry OS, S40, and Windows Phone, as well as desktop or laptop OSs, such as Windows and Mac OS. For illustrative purposes, some exemplary embodiments described herein are implemented with the Android OS for mobile devices.

In an exemplary Kid Mode, a user is provided with a "kid-friendly" environment permitting access to curated (e.g., previously identified as appropriate for an age or gender group) apps and games specifically made for kids; to browse Web content specific to their age and gender; to earn virtual currency by performing activities on the tablet; to spend virtual currency in an app store for kids; and to improve their educational skills through core-curriculum, state-standardized lessons.

In an exemplary Parent Mode, a user is provided with the default OS environment that allows them to have unrestricted access to all applications and content; to access the tablet's settings; to configure access controls for other users (e.g., Kid Mode); and to have unrestricted access to content acquisition facilities such as an online app store, music store or video store; and to make purchases with one-click.

According to some embodiments, a parent, or supervisory user, can monitor their child's time and usage of content in Kid Mode by viewing reports and analytics. In addition, a parent can allow or restrict their child's access in Kid Mode to certain apps, games or types of content via a series of on/off switches or other indications of whether access is enabled. In some embodiments, monitoring and configuration capabilities may be implemented via an online Parental Dashboard that is accessible via the Internet.

An advantage of combining a single OS with multiple different UIs is that one environment can control or be a supervisor of the other environment. Another advantage is that each user of the tablet can have his or her own UI and user experience.

Figure 4:
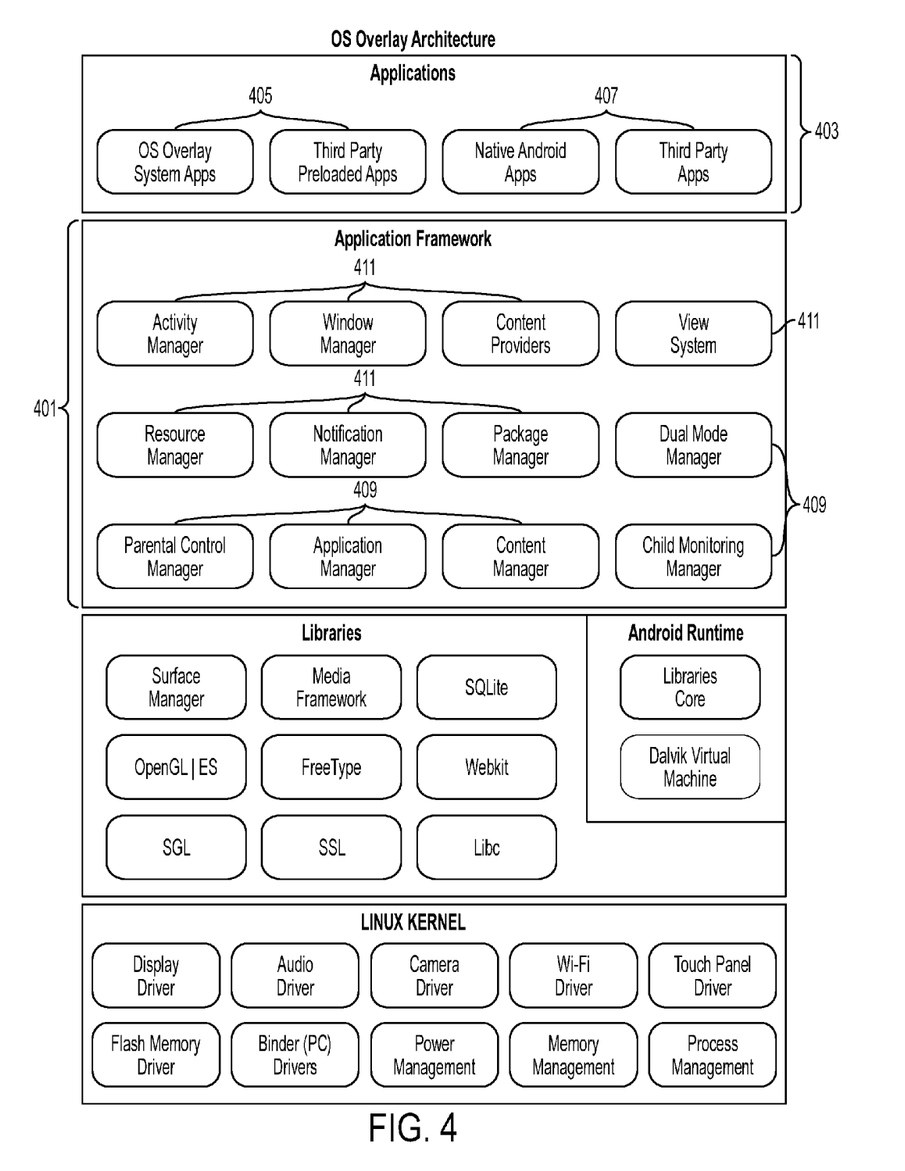
FIG. 4 is a diagram illustrating a core architecture of an OS Overlay system, according to some embodiments.

According to some exemplary embodiments that include an OS Overlay, the core architecture is as shown in FIG. 4. As shown, the OS Overlay is built on an existing OS Core, with OS Overlay system manager libraries added to the Application Framework level 401 of the existing OS Core, and additional applications included in the Application level 403 of the existing OS Core. As shown in the diagram of FIG. 4, native and third party OS Overlay applications 405 are included in the OS Core's Applications layer alongside native and third party Android applications 407. The access control system may be, for example and without limitation, one of the native and third party OS Overlay applications 405 or one of the third party Android applications 407. In the Application framework layer 400, OS Overlay system manager libraries 409 are included alongside Android system manager libraries 411.

The OS Overlay architecture enables a single OS to provide multiple switchable and customizable UIs supported and managed by a Mode Manager. In exemplary embodiments for use in a family group, switchable UI modes allow kids to use the tablet device in a protected Kid Mode environment, while allowing parents to manage Kid Mode's access to apps, content, and settings with the Parental Control Manager in Parent Mode and/or an online Parental Dashboard. Parents can also enjoy unrestricted access to the full capability of the OS in Parent Mode. The OS Overlay architecture also allows an embedded parental control that helps safeguard what kids can access within a safe environment, as well as providing a monitoring mechanism within the OS level to provide access, usage, and time spent on apps by the kid with the device.

At the Application Framework level, the OS Overlay system includes the following features and elements:

1. Mode Manager

In some exemplary embodiments, Mode Manager provides advantages over tablets shared by kids and parents using the same interface without a separate controlled environment for kids. Typically in such cases, controls are available but are applied indiscriminately in what may be referred to as a "locked down" mode, or the controls are turned off, resulting in an uncontrolled environment in which any user can access content and change system settings regardless of whether such activities are appropriate for a given user. Mode Manager provides for switchable user interface modes, including Parent Mode and Kid Mode. The NFC tag-containing physical key may be used in the access control system as a substitute for a password that would be required to switch from Kid Mode to Parent Mode or to authorize access in Kid Mode to resources that otherwise would not be available under an operative configuration of parental controls, discussed further below.

2. Parental Control Manager

In exemplary embodiments, Parent Control Manager provides the ability to manage and limit access for applications, content, and other settings in Kid Mode.

3. Child Monitoring Manager

In exemplary embodiments, Child Monitoring Manager offers access, usage, and time tracking for all activities in Kid Mode. In some embodiments, the Child Monitoring Manager is linked with an online Parental Dashboard service accessible via the Internet to provide real time web based reports. In some embodiments, the Child Monitoring Manager further provides monitoring of results of the use of contents, tests, performance assessments, and other user interaction with content. In addition to being used immediately for use in conjunction with an adaptive learning system, as described herein, the monitored results can also be uploaded to a remote facility such as a server where more extensive performance analysis can be conducted.

4. Application Manager

In exemplary embodiments, Application Manager provides the ability to manage and limit access for applications via Add Apps interface based on individual user profiles. This allows authorized sets of applications to be made available in the Kid Mode. The authorized sets of applications available in Kid Mode may be curated by a service provider or by a parent or other authority figure so that they are identified to be appropriate for an age or gender group or other subgroup of users.

5. Content Manager

In exemplary embodiments, Content Manager filters content based on user profile parameters, such as age, gender, and interests. It limits access to provide a safe environment in Kid Mode. For example, Content Manager may use content with pre-defined categorization in metadata tags that are related to user profile parameters. Content Manager may limit content access to a user profile by comparing the content's metadata with a user profile's parameters, and only providing content with metadata that meets user profile parameters. Content Manager provides customizable settings that may be modified by parents for providing each user profile personalized access to the content.

At the Application level, an exemplary embodiment of the OS Overlay includes OS Overlay System Apps, Third Party Preloaded Apps, Native Android Apps, and Third Party Apps.

Exemplary embodiments of the OS Overlay include Preloaded Custom Third Party Apps, which may include one or more custom third party apps that are pre-selected to provide and/or complement experiences deemed important for children, such as learn, create, watch, read, and play. Certain third party apps are tightly integrated with the OS Overlay system environment, including linking to the OS Overlay system's App Zone electronic retail store application, for example, to facilitate upgrade of a free third party app to a paid version.

Once an NFC tag-containing physical key is paired, it may be used as a physical substitute for a password or other form of authentication. Examples of such uses are described in the following paragraphs. A paired NFC tag-containing physical key may be the equivalent of a general password that may be used to authorize any restricted function or may be limited to authorizing one or more specific functions.

Figure 5:
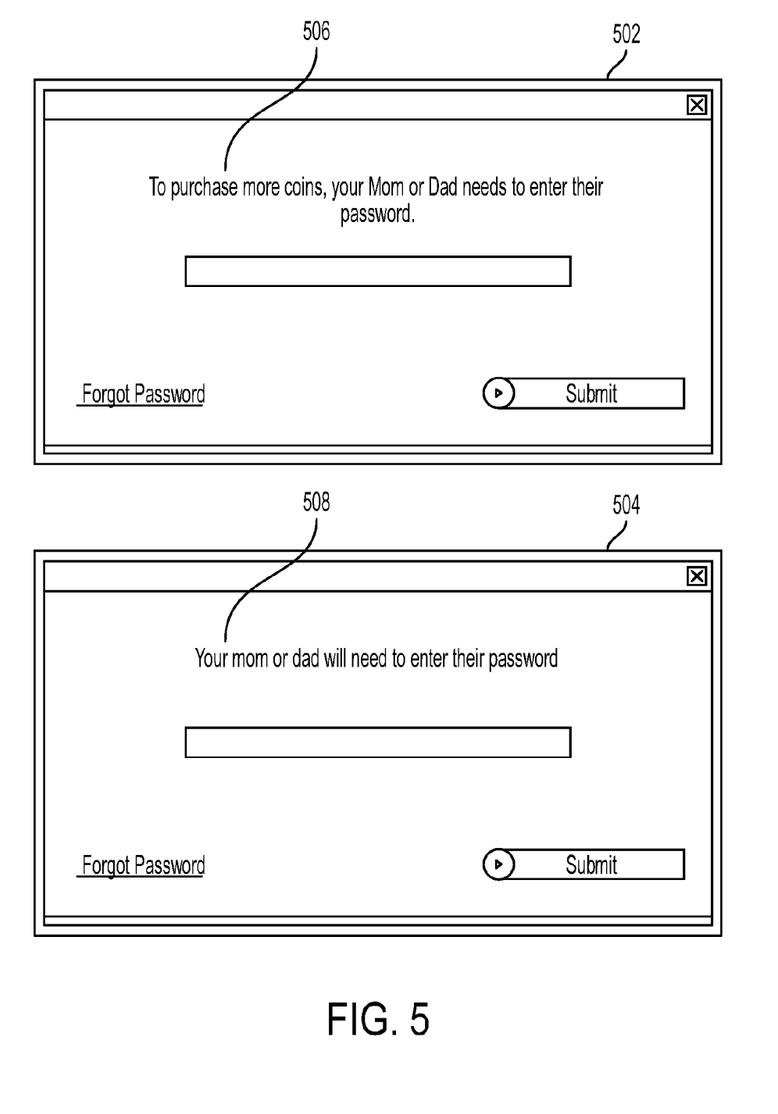
FIG. 5 is a diagram illustrating examples of user interfaces for prompting the input of a password, according to some embodiments.
Figure 6:
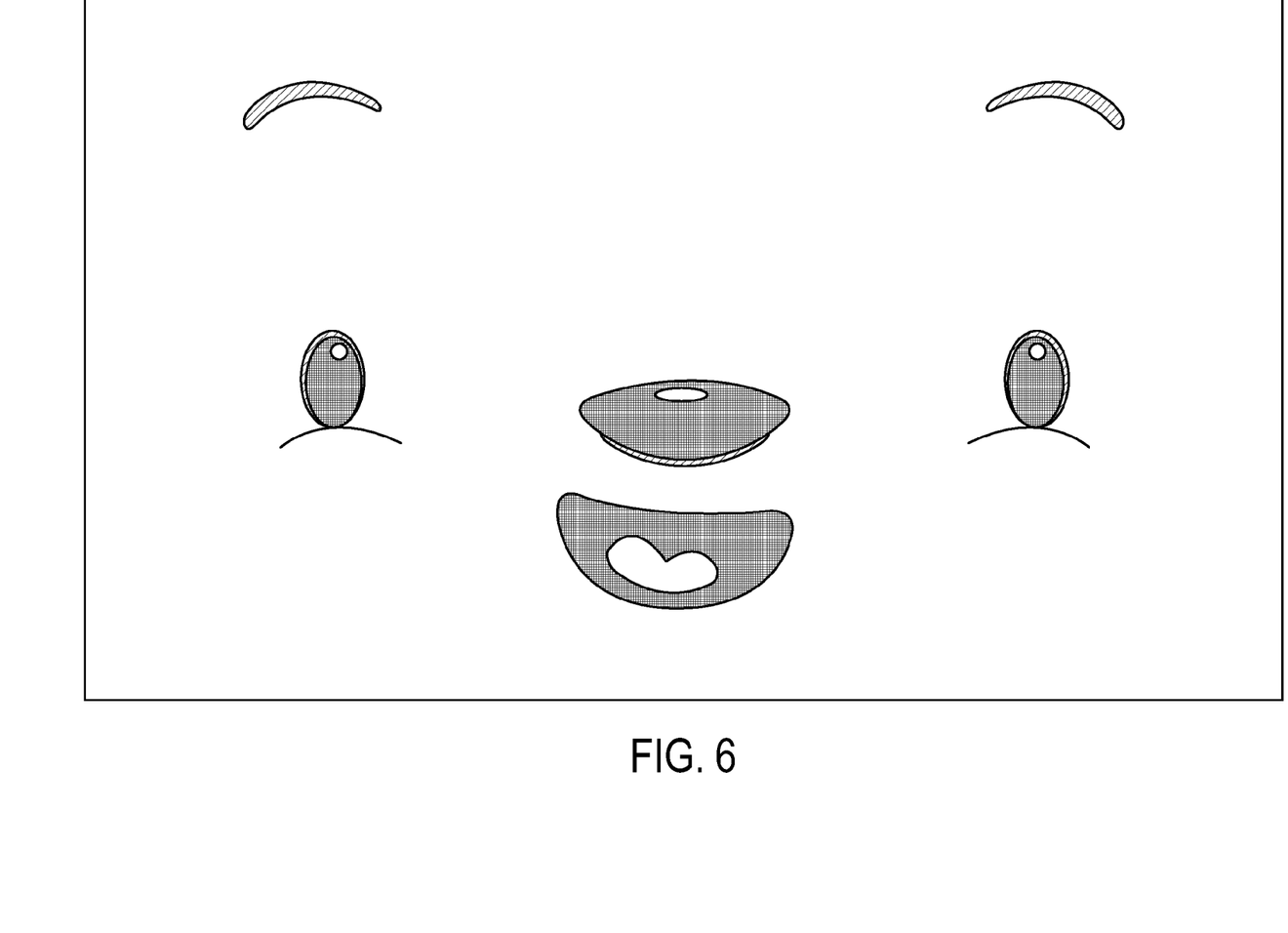
FIG. 6 is an example illustrating a view of a visual aspect of an interface for displaying a spoken prompt to input a password, according to some embodiments.

Examples of interfaces prompting the input of a password are shown in FIGS. 5 and 6. In FIG. 5, 502 is an example of an interface prompting input of a password to authorize the purchase of virtual coins, and 504 is an example of an interface prompting input of a password to authorize a generic action. FIG. 6 shows an alternative prompting interface for users who have difficulty reading and/or prefer a non-text prompt, according to some embodiments. In FIG. 6, an animated face provides spoken prompts in lieu of the text-based prompts shown in FIG. 5, which may be preferred over text-based interfaces for users unable to read and/or to convey messages in a format appropriate for a predetermined age group, for example. In some embodiments, the animated face may be shown with text on the interface, such as in a text-based caption. Other combinations of synchronized visualizations and sounds may be used to provide a sound prompt for prompting a user to input a password without departing from the spirit of the invention.

FIG. 7 illustrates an exemplary embodiment of a usage flow 700. The illustrated exemplary usage flow may be used in connection with switching between modes, authorizing payments, authorizing access to content, and/or to authorize completion of any action for which the computing device is configured to require authorization such as a password.

At step 702, request for access to a restricted feature or content that requires authorization under an operative configuration of the computing device is inputted. Such a request may include, without limitation, a request to switch from Kid Mode to Parent Mode (or any other change of user modes), a request for authorization to purchase an application from an application store or a content from a content store (such as an audio or video file containing a program of interest), or a request to access a content stored on the computing device that is not currently permitted under an operative configuration of the computing device. Such requests may be inputted by a user, or may be communicated by an app that desires access to a restricted feature or content for an aspect of the app's functionality. In response to the request 702, the input of a password is prompted at step 704. As noted above, such prompts may be in the forms shown in FIGS. 5 and 6 in exemplary embodiments. The usage flow then proceeds to step 706, at which an NFC tag-containing physical key is brought into close proximity to and/or tapped on the computing device. The NFC reader interface in the computing device initiates NFC communication with the NFC tag in the NFC tag-containing physical key and reads the ID of the tag. At step 708, the access control system determines whether the ID of the tag is on a list of paired IDs. If the ID is not on a list of paired IDs, then the process proceeds to step 710 and terminates. If the ID is on a list of paired IDs, then the process proceeds to step 712 and the access control system allows the request to be granted. In some embodiments, paired IDs are general purpose IDs, equivalent to a general password. In other embodiments, paired IDs are limited to one or more specific functions that may be authorized by a given paired ID. In these embodiments, paired IDs do not by default serve to authorize all functions that may be authorized by a general password but, rather, may be specified to authorize only one or more specific functions, and the list of paired IDs indicates which one or more specific functions may be authorized using a given paired ID. In the case of a request to switch from Kid Mode to Parent Mode, the switch is effected at step 712. In the case of a request for purchase authorization, the transaction is authorized at step 712 and, in some embodiments, download and/or installation of the purchased material is initiated. In the case of a request to access content stored on the computing device that is not currently permitted under an operative configuration of the computing device, access is granted at step 712.

In other exemplary embodiments, an ID can be re-programmed for a different intended use even though the ID is fixed in the NFC tag. For example, in the case of purchasing software online and downloading the module to be installed or allowed access online, it is often necessary to activate the software with an authorization key received separately, such as by email. To provide analogous functionality, any existing tag can be re-purposed to be used as an authorization key through a 2 step process. During the purchase of software or other content requiring an authorization key for activation, for example, via the e-commerce interface of the computing device, an ID of a physical key is read and communicated to the software publisher, store operator, or other distributor of the software. In turn, the ID is encoded in the downloaded software or other content instead of encoding the normal authorization key for activation. The physical key can then be used to activate and authorize access to the software in processes like those for passwords as illustrated in FIG. 7 and the accompanying written description.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A method of access control via a computing device, the computing device comprising a display, one or more processors, a non-transitory storage media, a near-field communication (NFC) reader interface, and an operating system, the method comprising:
   (1) performing initiation processing, comprising:
      a. detecting that a physical key is within proximity of the NFC reader interface;
      b. in response to detecting that the physical key is within proximity of the NFC reader interface, establishing a NFC communication link between the NFC reader interface and the physical key;
      c. reading and retrieving an identifier (ID) from the physical key by the NFC reader interface;
      d. determining whether the ID read from the physical key is included on a list of paired physical keys stored on the storage media;
      e. in response to determining that the ID read from the physical key is not included on the list of paired physical keys, determining whether the ID read from the physical key is included on a list of approved physical key identifiers stored on the storage media or stored on a computer other than the computing device;
      f. in response to determining that the ID read from the physical key is included on the list of approved physical key identifiers, displaying a password prompt;
      g. in response to the password prompt, receiving an input password from a user of the computing device;
      h. determining that the input password matches a predetermined password; and
      i. in response to determining that the input password matches the predetermined password, pairing the physical key with the computing device by encrypting and storing the ID read from the physical key on the list of paired physical keys; and
   (2) performing access processing, comprising:
      A. receiving a request to access a restricted resource;
      B. in response to the request, reading and retrieving the identifier (ID) from the physical key by the NFC reader interface;
      C. determining that the ID read from the physical key is included on the list of paired physical keys stored on the storage media; and
      D. in response to determining that the ID read from the physical key is included on the list of paired physical keys, allowing access to the restricted resource.

2. The method of claim 1, wherein the physical key comprises a NFC tag.

3. The method of claim 1, wherein the list of approved physical key identifiers stored on the storage media of the computing device is encrypted.

4. The method of claim 1, wherein the computing device further comprises a wireless data communication interface, and the list of approved physical key identifiers is stored on a computer other than the computing device, the method further comprises:
   communicating, via the wireless data communication interface, with the computer other than the computing device in connection with determining whether the ID read from the physical key is included on a list of approved physical key identifiers.

5. A computing device having access control, the computing device comprising a display, one or more processors, a non-transitory storage media, a near-field communication (NFC) reader interface, and an operating system, wherein the storage media includes instructions stored therein and when executed by the one or more processors causes the one or more processors to:
   (1) perform initiation processing, comprising:
      a. detecting that a physical key is within proximity of the NFC reader interface;
      b. in response to detecting that the physical key is within proximity of the NFC reader interface, establishing a NFC communication link between the NFC reader interface and the physical key;
c. reading and retrieving an identifier (ID) from the physical key by the NFC reader interface;
d. determining whether the ID read from the physical key is included on a list of paired physical keys stored on the storage media;
e. in response to determining that the ID read from the physical key is not included on the list of paired physical keys, determining whether the ID read from the physical key is included on a list of approved physical key identifiers stored on the storage media or stored on a computer other than the computing device;
f. in response to determining that the ID read from the physical key is included on the list of approved physical key identifiers, displaying a password prompt;
g. in response to the password prompt, receiving an input password from a user of the computing device;
h. determining that the input password matches a predetermined password; and
i. in response to determining that the input password matches the predetermined password, pairing the physical key with the computing device by encrypting and storing the ID read from the physical key on the list of paired physical keys; and (2) perform access processing, comprising:
   A. receiving a request to access a restricted resource;
   B. in response to the request, reading and retrieving the identifier (ID) from the physical key by the NFC reader interface;
   C. determining that the ID read from the physical key is included on the list of paired physical keys stored on the storage media; and
   D. in response to determining that the ID read from the physical key is included on the list of paired physical keys, allowing access to the restricted resource.

6. The computing device of claim 5, wherein the computing device further comprises a wireless data communication interface, the list of approved physical key identifiers is stored on a computer other than the computing device, and the storage media of the computing device further includes instructions stored therein and when executed by the one or more processors causes the one or more processors to:
   communicate, via the wireless data communication interface, with the computer other than the computing device in connection with determining whether the ID read from the physical key is on a list of approved physical key identifiers.

* * * * *